United States Patent

Burow et al.

Patent Number: 6,117,228
Date of Patent: Sep. 12, 2000

[54] HEAT-STABLE IRON OXIDE YELLOW PIGMENTS

[75] Inventors: Wilfried Burow, Krefeld, Germany; Wolfgang Oehlert, Wheeling, W. Va.

[73] Assignee: Bayer AG, Germany

[21] Appl. No.: 09/192,670

[22] Filed: Nov. 16, 1998

[30] Foreign Application Priority Data

Nov. 19, 1997 [DE] Germany ............................ 197 51 142

[51] Int. Cl.[7] .................................................. C01G 49/02
[52] U.S. Cl. ......................... 106/456; 106/457; 106/459; 106/212; 423/632
[58] Field of Search ............................. 423/432; 106/456, 106/457, 459, 212

[56] References Cited

U.S. PATENT DOCUMENTS

| 4,053,325 | 10/1977 | Vanderheiden . | |
| 4,374,677 | 2/1983 | Senda et al. | 106/309 |
| 4,376,656 | 3/1983 | Senda et al. . | |
| 4,620,879 | 11/1986 | Burow et al. . | |
| 4,698,100 | 10/1987 | Burow et al. . | |
| 4,734,136 | 3/1988 | Burow | 106/304 |

FOREIGN PATENT DOCUMENTS

| 221473 | 5/1987 | European Pat. Off. . |
| 463773 | 8/1928 | Germany . |
| 2740861 | 3/1978 | Germany . |
| 53-102298 | 2/1977 | Japan . |

*Primary Examiner*—C. Melissa Koslow
*Attorney, Agent, or Firm*—Connolly Bove Lodge & Hutz LLP

[57] ABSTRACT

Pure-coloured iron oxide yellow pigments having a silking index of less than 5 and a heat resistance of greater than 220° C. in polyethylene for at least 5 minutes are obtained by oxidation of metallic iron with nitrobenzene in an acid medium in the presence of compounds of elements chosen from main groups 3 and 4 of the periodic table.

18 Claims, No Drawings

HEAT-STABLE IRON OXIDE YELLOW PIGMENTS

The present invention relates to pure-coloured, low-silking iron oxide yellow pigments with an almost isometric particle shape and high heat resistance.

Iron oxide coloured pigments, which are employed as ecologically acceptable colorants in ceramics, building materials, plastics, paints and paper, can be obtained, in principle, in black, yellow, red and brown colour shades.

Iron oxide pigments are obtained, as described in Ullmann's Encyclopaedia of Industrial Chemistry, VCH, Weinheim 1992, vol. A20, p. 298 et seq., by solid phase reactions (red, brown and black pigments), precipitation and hydrolysis reactions of iron salts (yellow, red, orange and black pigments), and by the Laux process, described in DE-A 463 773, of oxidation of iron with aromatic nitro compounds in the presence of hydrolysable, polyvalent salts (black and yellow pigments).

Naturally occurring and synthetic iron oxide yellow pigments are used for colouring building materials, paints, plastics and paper.

Conventional bright, pure-coloured iron oxide yellow pigments are in the form of needle-shaped pigment particles and, because of their needle shape, have a lower bulk density than isometric particles, which has an adverse effect during storage.

Compared with isometric pigment particles, undesirably high viscosities are furthermore observed in paint pigment dispersions of needle-shaped pigments. In addition, the binder requirement of needle-shaped pigments is significantly higher than with isometric pigments.

Because of their needle shape, the anisometric iron oxide yellow pigments align in a preferred direction parallel to their needle axis in paint films and when incorporated into films of plastics. Since their optical properties (absorption and scattering) in the direction of the needle axis differ from the optical properties at a right angle to the needle axis, the observer has different impressions of the colour, depending on whether the paint film or the coloured film is viewed in the preferred direction or perpendicular thereto. This undesirable effect, which is called "silking", since it was first observed on silk fabrics, considerably restricts the use of iron oxide yellow pigments.

The degree of silking of iron oxide yellow pigments can be reduced by mixing needle-shaped iron oxide pigments with isometric yellow pigments, such as nickel rutile yellow. Nickel rutile yellow pigments are considerably more expensive than iron oxide yellow pigments. Isometric pigments such as nickel rutile yellow of course show no silking effect.

Since yellow iron oxide pigments are ecologically acceptable and inexpensive to prepare, efforts are being made in principle to produce yellow colorations as far as possible exclusively with iron oxide pigments without the use of more expensive pigments such as nickel rutile yellow.

A disadvantage of conventional iron oxide yellow pigments, in addition to the silking effect observed, is their inadequate heat resistance. The removal of chemically bonded water in goethite during exposure to heat leads to an undesirable discoloration to brown-red. Because their heat resistance is too low, conventional iron oxide yellow pigments cannot be employed in the paper industry, in many plastics systems, for example for colouring thermoplastics, or in the coil-coat process for paint applications.

The present invention provides a method of processing pigment under greater than 230° C. conditions comprising adding the iron oxide yellow pigment described below. The iron oxide yellow pigment described below can be used to colour thermoplastic, laminating paper, powder coating and enamel.

Since iron oxide yellow pigments in principle have the advantages of high environment-friendliness and low production costs, there are numerous technical solutions for improving individual of the abovementioned adverse properties of iron oxide yellow pigments.

Inorganically or organically after-treated needle-shaped iron oxide yellow pigments have been developed specifically for the particular binder system for paint films with iron oxide yellow pigments, which require a low viscosity and high colour purity, as well as a low binder requirement. Although these pigments show reduced viscosities in the binder, with a low binder requirement, they are unsuitable for all paint pigment dispersions, in which their typically high silking effect causes trouble.

Bright, pure-coloured, low-silking iron oxide yellow pigments which are obtained from special seeds produced in the presence of compounds of the elements B, Al, Ga, Si, Ge, Sn or Pb (DE-A 33 26 632) are indeed sufficiently free from silking for colouring films of plastics, but are not sufficiently heat-resistant for colouring plastics.

To improve the heat resistance of iron oxide yellow pigments, coating processes using metal phosphates (DE-A 2 740 861 and U.S. Pat. No. 4,053,325), Al compounds or hydrothermal syntheses (U.S. Pat. No. 4,376,677, JP-A 53 102 298, U.S. Pat. No. 4,376,656) have been proposed. Iron oxide yellow pigments of improved heat resistance are obtained, but these can be employed to only a limited extent because of other adverse properties, for example because of their high price, their low colour purity and their low colouring power, and their pronounced silking effect.

Adequate heat resistance, adequate colour purity and tinctorial strength and absence of silking are therefore prerequisites for the use of yellow pigments for colouring films of plastics. Conventional coated iron oxide yellow pigments are not employed here because of their silking effect. Hydrothermally produced, heat-resistant iron oxide yellow pigments are not used for films of plastics because of their high costs, their low tinctorial strength and their silking effect.

Products which combine in them the properties of high brightness, high colour purity, adequate heat resistance, low viscosity, low silking effect, low binder requirement and high bulk density have not been known hitherto.

For iron oxide yellow pigments, there have therefore hitherto been only technical solutions which improve the individual adverse properties of conventional iron oxide yellow pigments, such as the silking effect or heat resistance.

The present invention is therefore based on the object of providing bright, pure-coloured, low-silking iron oxide yellow pigments which have a heat stability which is adequate for colouring films of plastics.

It has now been found, surprisingly, that the desired iron oxide yellow pigments which have the abovementioned properties in a hitherto unknown combination of favourable properties can be prepared by means of a modified nitrobenzene reduction process in the presence of compounds of elements of groups IIIa and/or IVa (CAS-Notation) of the periodic table.

The invention provides iron oxide yellow pigments having an Fe content of greater than 58 wt. %, a silking index of less than 5 and colour values for the Purton of the pigment in the brightness $L^*$ of 54 to 65 CIELAB units, in the saturation $C^*$ of 38 to 65 CIELAB units with a red content $a^*$ of 8 to 15 CIELAB units, a yellow content of 37 to 55

CIELAB units and a heat resistance of greater than 220° C. in polyethylene for at least 5 minutes.

The yellow content b* of the iron oxide pigments according to the invention is preferably 37 to 53 CIELAB units, and the red content is preferably 8 to 14 CIELAB units.

The heat resistance of the iron oxide pigments according to the invention is preferably greater than 230° C., in particular greater than 240° C., particularly preferably greater than 250° C., and in a specific embodiment even greater than 260° C., for at least 5 minutes.

The silking index of the iron oxide pigments according to the invention is preferably less than 3, in particular less than 2.

The bulk density of the iron oxide pigments according to the invention is preferably more than 0.5 g/ml, in particular more than 0.6 g/ml.

The iron oxide pigments according to the invention preferably contain elements chosen from main groups 3 and 4 of the periodic table, in particular compounds of aluminum, gallium, silicon or germanium, in particular 0.3 to 15 wt. %, particularly preferably 0.5 to 10 wt. %, of aluminum compounds, calculated as $Al_2O_3$.

The present invention also provides a process for the preparation of the iron oxide yellow pigments according to the invention in an iron-dissolving process by oxidation of metallic iron with nitrobenzene in an acid medium, characterized in that the reaction is carried out in the presence of compounds of elements chosen from main groups 3 and 4 of the periodic table, preferably aluminum compounds.

The content of aluminum compounds is preferably chosen such that the finished iron oxide pigment contains 0.3 to 15 wt. %, in particular 0.5 to 10 wt. %, of aluminum compounds, calculated as $Al_2O_3$.

A water-soluble aluminum salt, in particular aluminum chloride, is preferably employed as the aluminum compound.

The preparation of the pure-coloured, low-silking, heat-stable iron oxide yellow pigments is to be described by way of example with the aid of the following examples, it being possible for the expert to vary the choice of the technical units or of the additional substances as required.

The parts and percentages stated in the following examples relate to the weight, unless indicated otherwise.

Purton measurement

The colour evaluation of the pigments obtained according to the invention is carried out in ®Alkydal F 48 (alkyd resin from Bayer AG) at a pigment volume concentration of 10%.

"Alkydal® F 48" is a medium-oil air-drying alkyd resin based on drying plant fatty acids, in white spirit/xylene 38:7 (with a non-volatile content of approx. 55%), oil coritent/triglyceride in the non-volatile content: approx. 48%, phthalic anhydride in the non-volatile content: approx. 26%.

Composition of a typical lacquer:
95.26% Alkydal F 48 in white spirit/xylene (38/7),
0.78% 2-butanoxime 55% in white spirit (anti-skinning agent),
1.30% organic calcium salt in xylene (with 4% Ca) ®Octa Soligen Calcium 4 (wetting agent, Borchers AG),
0.22% organic cobalt salt in xylene (with 6% Co) ®Octa Soligen Kobalt 6 (drier, Borchers AG),
0.87% organic zirconium salt in xylene (with 6% Cr) ®Octa Soligen Zirkonium 6 (auxiliary drier, Borchers AG),
1.57% butyl glycolate (flow promoter).

The components are mixed with a high-speed laboratory stirrer to give the finished paint. A plate paint-grinding machine (muller), as described in DIN EN ISO 8780-5 (April 1995), is used. An ®Engelsmann Jel 25/53 muller (product of Engelsmann) with an effective plate diameter of 24 cm is used. The speed of rotation of the lower plate is approx. 75 min$^{-1}$. Due to the intrinsic weight of the upper plate and an additional weight of 2.5 kg on the loading bar, the force between the plates is approx. 0.5 kN. 0.3 g pigment and 2.00 g lacquer are dispersed in one stage of 100 revolutions by the process described in DIN EN ISO 8780-5 (April 1995) section 8.1. The muller is opened and the paint is collected all at once on the lower plate outside the central point. A further 2.00 g lacquer are then added and the plates are folded together. After two stages of 50 revolutions without an additional weight, the preparation has ended.

The pigmented lacquer is coated on to non-absorbent cardboard with a suitable film-casting unit (gap height at least 150 μm, not more than 250 μm). The painted cardboard (coated material) is then dried at room temperature in a low-dust location for at least 12 h. Before the colour measurement, the coated material is dried at approx. 65° C. for one hour and cooled.

A spectrophotometer ("colour-measuring instrument") with an Ulbricht ball and with d/8 measurement geometry without a gloss trap is used. This measurement geometry is described in ISO 7724/2-1984 (E) point 4.1.1, in DIN 5033 part 7 (July 1983) point 3.2.4 and in DIN 53236 (January 1983) point 7.1.1. A Data flash 2000 measuring instrument from Datacolor International is used.

The colour-measuring instrument is calibrated against a white, ceramic working standard as described in ISO 7724/2-1984 (E) point 8.3. The reflectance data of the working standard with respect to an ideally matt-white body are stored in the colour-measuring instrument, so that after calibration with the white working standard, all the colour measurements are related to the ideally matt-white body. The black point calibration is carried out with a black hollow body from the manufacturer of the colour-measuring instrument.

The colour measurement is carried out immediately after preparation of the test specimens. A gloss trap which is possibly present is cut out. The temperature of the colour-measuring instrument and test specimen is approx. 25° C.±5° C.

The coated material is placed on the colour-measuring instrument such that the measurement opening covers a central point of the paint layer. The coated material must lie completely and flat on the instrument. The measurement opening must be covered completely by the paint layer. The measurement is then carried out.

From the reflectance spectra measured, the CIE co-ordinates L*, a* and b* of 1976 are calculated according to the calculation instructions in ASTM E 308-1985, point 7. The weighting functions of standard illuminant C and the 20 standard observer of 1931 in ASTM E 308-1985, table 5.6 are used. The wavelength range is between 400 nm and 700 nm. The wavelength interval is 20 nm. No gloss is subtracted in the calculation. The reflectance values obtained are converted into the CIELAB colour data system in accordance with DIN 5033, part 3 (July 1992).

Silking index

Preparation in an alkyd resin paste for measurement of the silking index

The pigment is prepared in a non-drying test binder using a plate paint-grinding machine (muller). The test binder (paste) comprises two components:

Component 1

Component 1 is an alkyd resin binder based on linseed oil and phthalic anhydride. It complies with the specification given as requirements of a test binder for coloured pigments in the standards DIN EN ISO 787-24:1995, ISO 787-25:1993 and DIN 55 983 (December 1983). The product ®Sacolyd L 640 (Krems Chemie), formerly ®Alkydal 64 (Bayer AG), is used.

Component 2

Component 2 is a rheological additive which is added to achieve thixotropic properties in the paste. A pulverulent, modified hydrogenated castor oil ®Luvothix trademark of HT (Lehmrann & Voss & Co.) in a concentration of 5.0% is used.

The Luvothix HT is dissolved in the ®Sacolyd L 640 at 75 to 95° C. The cooled, puncture-proof mass is passed once over a triple-roll mill. The paste is then ready.

To prepare the pigment paste, a plate paint-grinding machine (muller), as described in DIN EN ISO 8780-5 (April 1995), is used. An ®Engelsmann Jel 25/53 muller (product of Engelsmann) with an effective plate diameter of 24 cm is used. The speed of rotation of the lower plate is approx. 75 min$^{-1}$. Due to the intrinsic weight of the upper plate and an additional weight of 2.5 kg on the loading bar, the force between the plates is approx. 0.5 kN. 0.40 g pigment and 5.00 g paste are dispersed in three stages of 25 revolutions each by the process described in DIN EN ISO 8780-5 (April 1995) section 8.1.

The pigment/paste mixture is then spread into a paste dish which corresponds in its function to the paste dish in DIN 55 983 (December 1983). The doctor blade belonging to the paste dish is drawn over the depression of the dish filled with the pigment/paste mixture so that a smooth surface is formed. During this operation, the doctor blade is moved in one direction at a speed of approx. 3 to 7 cm/s. By this preparation, any needle-shaped particles present in the pigment are aligned in the direction of the drawing with the doctor blade. The smooth surface is measured within a few minutes.

The 8/d measurement geometry used for the silking measurement is described in ISO 7724/2-1984 (E) point 4.1.1, in DIN 5033 part 7 (July 1983) point 3.2.4 and in DIN 53 236 (January 1983) point 7.1.1. A ®Perkin Elmer Lambda 19 (product of Perkin Elmer) with a ®Labsphere Ulbricht ball of 15 cm diameter (product of Labsphere) is used.

For the measurement, a commercially available film linear polarization filter of adequate size is incorporated in a defined position outside the integration ball in the illuminating beam for the sample, so that the direction of the E vector (electric field) of the transmitted light beam in the measurement spot (sample opening) is known. The filter has a degree of polarization of >99%. The reference beam remains unchanged without a filter.

The reference measurement opening of the integration ball is closed with a diffusely scattering, white opal glass standard. No gloss trap is used.

After installation of the filter, another white opal glass standard (working standard) is placed on the sample opening and the measuring instrument is calibrated. The working standard complies with the requirements described in ISO 7724/2-1984 (E) section 8.3. The reflectance data of the working standard with respect to an ideally matt-white body are stored in the computer, so that after calibration with the white working standard, all the colour measurements are related to the ideally matt-white body. The dark current in the black point is measured with a black hollow body, stored in the computer and taken into account by the measurement program during the calibration.

The measurement is carried out immediately after preparation of the test specimens. The temperature of the colour-measuring instrument (reflectance spectrometer) and sample is approx. 25° C.+/−5° C.

The sample is measured in two positions at right angles to one another, with reference to the polarizing filter:

Measurement $Y_{1\|}$: The pigment particles are aligned with their longest axis largely parallel to the E vector of the illumination. The drawing direction of the doctor blade lies parallel to the E vector.

Measurement $Y_{2\perp}$: The pigment particles are aligned with their longest axis largely perpendicular to the E vector of the illumination. The drawing direction of the doctor blade and the E vector are at right angles to one another.

A device for rotating the sample through 90° is helpful, but not absolutely necessary if suitable markings are located on the sample opening.

The Y tristimulus value is calculated from the reflectance spectra measured, in accordance with the calculation instructions in ASTM E 308-1995, point 7. The weighting functions of standard illuminant C and of the 2° standard observer of 1931 in table 5.6 are used. The wavelength range lies between 400 nm and 700 nm. The wavelength interval is 20 nm. No gloss is subtracted in the calculation.

The silking index SI is then calculated from the Y tristimulus value as follows:

$$SI=(1-Y_{1\|}/Y_{2\perp})*100$$

The result is rounded up to a whole number. An SI of almost zero demonstrates the absence of a silking effect, while an SI of >approx. 5 indicates a silking pigment.

Heat resistance

The heat resistance can be determined by the methods described below.

METHOD I

The heat resistance of the yellow pigment can be determined in a simple manner by subjecting the pigment to a heat treatment in a circulating air drying cabinet. The amount of sample in the porcelain dish should be 5 g, and the residence time at the test temperature should be 30 min. 160° C. is chosen as the lowest test temperature and the test temperature is increased in intervals of 10° C. The temperature at which the pigment to be tested shows a clear change in colour to red for the first time is determined. In addition, a colour evaluation can be carried out on all the heat-treated samples. The dried sample of the coated yellow pigment is chosen as the reference. The colour shades of the heat-treated samples are determined in the binder ®Alkydal F 48 at a pigment volume concentration of 10% in accordance with DIN 6174 (equivalent to ISO/DIN 7724, 1–3 drafts). Since a change in colour of the yellow pigment to red is undesirable, the colour distances Da* (a*-red content) of the pigment samples from the reference (dried sample of the coated pigment) are calculated in accordance with DIN 6174. The test temperature, rounded up to the nearest 10° C., at which a colour distance of Da*=3 from the reference results for the pigment indicates the heat resistance of the yellow pigment.

METHOD II

To test the heat resistance of the yellow pigment, it is furthermore possible to use DIN 53 772: Testing of colorants in thermoplastics. Determination of the heat resistance by injection moulding.

The heat resistance is determined in accordance with DIN 53 772.

10 g of the yellow pigment to be tested are mixed with 1 kg of non-coloured poly-ethylene granules of high density, a thermoplastic ®Vestolen A 6016 (Chemische Werke Hüls AG), in a glass bottle on a roller block for 20 min. The mixture is then processed to uniformly coloured test granules on a twin-screw extruder with a granulating device. The test granules are dried at 70° C. for 4 h.

The coloured test specimens in sheet form for evaluation of the heat resistance (flat surface, at least 2.5 mm thick, suitable for colour measurement) are produced with a screw injection moulding machine type ®Arburg 200 (trademark of Allraunder, Arburg, Loβburg), with an appropriate injection mould. The contents of the screw-plunger give 5 test specimens. The injection moulding machine has an electrical temperature-measuring instrument with a temperature probe for measuring the temperature in the melt. The machine is filled with test granules and heated up to 200° C. During this procedure, 12 sheets (test specimens) are injection-moulded and discarded. When 200° C. is reached, 5 sheets are injection-moulded and numbered as test specimens 1 to 5. They serve as comparison and reference specimens for the following temperature stages.

The test or injection moulding temperature is then increased at intervals of 20° C. (or 10° C.). During heating up to the next particular test temperature, 6 sheets are injection-moulded and discarded. When the test temperature is reached, the injection moulding cycle is interrupted and the melt and therefore also the iron oxide yellow pigment contained in it is exposed to this temperature for 5 min. 5 sheets (test specimens) are then injection-moulded and numbered. The next higher temperature is then established in the same manner and the operation (5 min. exposure to the temperature, then injection moulding of 5 test specimens) is repeated. The test temperature is increased by 20° C. (or 10° C.) until clear streaking or a change in colour to red can be observed on the test specimens. To evaluate the heat resistance, sheets 2 and 3 are used and are compared with the test specimens injection-moulded at 200° C.

A simple visual evaluation is possible. The highest possible injection moulding 1 5 temperature at which the specimen sheets show no streaks and, by comparison with the test specimens injection-moulded at 200° C., no change in colour shade to red is determined. According to DIN 53 772 (determination of the heat resistance by injection moulding), the test specimens are tested colorimetrically in accordance with DIN 53 236 and DIN 6174 for a colour difference compared with the test specimens produced at the lowest test temperature (200° C.). According to DIN 53 722, the test temperature at which a colour difference of dE*a b=3 occurs between the test specimens is the heat resistance of the iron oxide yellow pigment, based on the test medium (polyethylene, ®Vestolen A 6016). The colour distances of the test specimens from the reference are plotted on a graph as a function of the test temperature in ° C. The test temperature in ° C. at which the colour distance DE*a b=3 is determined by interpolation on the graph, and this value is rounded up to the nearest 10° C. According to DIN 53 772, it is a measure of the heat resistance of the pigment in the plastic chosen.

METHOD III

The heat resistance can also be determined using the method according to DIN 53 775 part 2, October 1990, Testing of colorants in PVC moulding compositions.
Determination of the oil absorption value in accordance with ISO 787 part 5
Working equipment:
analytical balance
glass plate 300×400 mm
blade spatula
10 ml burette
Reagents:
linseed oil for paint with an acid number of 5.0–7.0 mg/9 g KOH
Sample preparation:
The accurately weighed amount of sample
 a) red, black, brown pigments: 4 g,
 b) yellow pigments: 2 g
is placed on the glass plate. The linseed oil for paint is slowly added dropwise from the burette. After each addition, the oil is rubbed into the pigment with the blade spatula. The addition of the oil is continued until a putty-like paste has formed. It should be possible to divide up the paste again without it breaking, crumbling or forming streaks on the glass plate. The addition of the oil should take approx. 10 to 15 min. The amount of oil used is noted.

Calculation:

OAV=oil absorption value of the sample: oil consumption in g per 100 g pigment
Density of the oil: 0.93 g/ml
V=amount of oil used in g
m=weight of the sample in g $$OAV = \frac{0.93 \times 100 \times V}{m}$$

Bulk density:

Working equipment:
balance, accuracy 0.1 g
measuring cylinder 500 ml
sieve, mesh width 500 μm
Procedure:

An amount of pigment sufficient for 500 ml of sieved material is sieved through a 500 μm mesh sieve. 500 ml thereof are introduced into a previously weighed measuring cylinder and weighed. The operation should be carried out smoothly and without shaking. The determination is carried out in duplicate. The result is calculated from the individual values by obtaining the mean.

Calculation:

Rho=M/500

Rho=bulk density in g/ml
500=volume in ml
M=weight in g

Iron oxide pigments which are obtained by reaction of metallic iron raw materials with nitrobenzene are prepared according to the Laux process, which is described in the patents DE-C 463 773, DE-C 464 561 and DE-C 515 758. By varying the additional starting substances, the expert can determine the iron oxide phases obtainable in the Laux process ($\alpha$-FeOOH, $\gamma$-Fe$_2$O$_3$, $\alpha$-Fe$_2$O$_3$ or Fe$_3$O$_4$). The following substances are reacted in accordance with the procedure described in the examples in DE-C 463 773 in containers and tanks equipped with stirrers:

| | Batch (initial mixture) | | | | | | Charging (metering period) | | | | | | | |
|---|---|---|---|---|---|---|---|---|---|---|---|---|---|---|
| | Aluminium chloride solution | | | | | | Steel granules | | Nitrobenzene | | Dilution water | | Cast iron chips | |
| | Amount | Content g/l | Water | Temperature | Steel granules | Nitro-benzene | Amount | Metering time* min | Amount | Metering time* min | Amount | Metering time* min | Amount | Metering time* min |
| 1 | 410 ml | 300 | 182 ml | room temperature | 470 g | 87 ml | 374 g | 120–210 | 710 ml | 0–300 | 610 ml | 60–120 | 70 g | 300–305 |
| 2 | 410 ml | 300 | 182 ml | room temperature | 470 g | 87 ml | 374 g | 120–210 | 710 ml | 0–300 | 610 ml | 60–120 | 70 g | 300–305 |
| 3 | 410 ml | 300 | 182 ml | room temperature | 470 g | 87 ml | 374 g | 120–210 | 710 ml | 0–300 | 610 ml | 60–120 | 70 g | 300–305 |
| 4 | 250 ml | 160 | — | room temperature | 50 g | 95 ml | 380 g | 0–240 | 240 ml | 0–120 | 600 ml | 150–230 | | |
| 5 | 250 ml | 160 | — | room temperature | 50 g | 95 ml | 380 g | 0–240 | 240 ml | 0–120 | 600 ml | 150–230 | | |
| 6 | 6600 ml | 300 | 5020 ml | 50° C. | 10800 g | 2140 ml | 6000 g | 90–150 | 11200 ml | 0–150 | 15000 ml | 60–150 | — | |
| 7 | 4420 ml | 300 | 7200 ml | 50° C. | 10800 g | 2140 ml | 6000 g | 90–150 | 11200 ml | 0–150 | 15000 ml | 60–150 | — | |
| 8 | 4710 l | 300 | 2090 l | 50° C. | 5400 kg | 600 + 600 kg | 4000 kg | 150–225 | 9800 kg | 0–340 | 7000 l | 90–150 | 1400 kg | 310–360 |
| 9 | 4710 l | 300 | 2090 l | 47° C. | 5400 kg | 300 + 600 kg | 4800 kg | 85–160 | 10100 kg | 0–295 | 7000 l | 40–125 | 1000 kg | 295–335 |
| 10 | 4710 l | 300 | 2090 l | 45° C. | 5400 kg | 300 + 600 kg | 5000 kg | 85–170 | 10100 kg | 0–285 | 7000 l | 45–135 | 1000 kg | 285–325 |

*Start of metering to end of metering
t: 0 min = reduction temperature reached 97° C. = boiling point, reflux. In experiments no. 8 to 10 15 min later.

Procedure for experiments 1 to 5

Description of the reaction apparatus:

Equipment:
- 2 l pot with a ground glass neck and a ground glass lid with 4 NS
- 29 ground glass connections,
- seal for the ground glass neck of Centelen, clamping ring,
- intensive reflux condenser,
- Claisen attachment,
- PTFE bellows,
- 2 ®ProMinent metering pumps (Trademark of ProMinent, Heidelberg) for nitrobenzene and drinking water with a 500 ml dropping funnel as the pump reservoir,
- ®LABC universal stirrer guide (trademark of LABC-Labortechnik),
- 3 stage crossbar with a ®Teflon wiper, set at 75°,
- stirrer drive (IKA, RW 27 or RW 28, IKA, Staufen),
- ®Cerankochfeld glass-ceramic plate (Schott Geräte GmbH, Hofheim) with an oil bath (silicone oil P300, BAYER AG),
- temperature regulator (Julabo Labortechnik, Seelbach) with a Pt 100 measuring probe,
- PTFE base support for the pot with a ground glass neck in the oil bath Construction: The sealing ring is placed on the pot with a ground glass neck, the stirrer is inserted and the lid is fixed with the clamping ring. The NS ground glass connections are provided with Teflon sheaths and the stirrer guide is attached. When assembling, it should be ensured that the ground glass connections lie exactly over one another and the stirrer is centred. The apparatus is placed on the PTFE base support in the oil bath (oil bath level 10 cm above the base support), one ground glass connection at the front, apparatus clamped in 2 places. The stirrer is attached, distance from the bottom of the lowest stirrer blade 2 to 3 mm. The Pt 100 measuring probe is introduced into the oil bath, probe tip at the level of the base of the pot with a ground glass neck. Finally, the condenser with the Claisen attachment and the PTFE bellows is mounted. The metering syringes for nitrobenzene and drinking water are attached during the course of the experiment.

Procedure:

Preparation: The reagents required according to the table (aluminum chloride solution, iron, water and nitrobenzene) are prepared and the pump reservoirs are filled. The steel granules employed are granules from Vulkan, Hattingen with a content of C and Si of <1 wt. % each and a content of >40 wt. % of particles having a diameter of 1 to 2 mm. The cast iron chips employed are sieved grey cast iron chips with a content of >60% from the sieve fraction of 1 to 2 mm. The cooling water is turned on. The initial mixture is introduced in the sequence shown, at room temperature and while stirring at 250 to 400 rpm. The bath is heated up to a temperature of 90° C.

Progress: When the required temperature is reached, metering is started according to the recipe. The cast iron chips/steel granules are metered in during the charging in ten part amounts of equal size, added every 10 minutes.

End point: When all the additions have been concluded, the mixture is subsequently stirred for 60 minutes, and the conversion of the nitrobenzene into aniline is then checked. For this, a small amount of paste (crude aniline) is removed with a spatula and is introduced into a 50 ml glass beaker. The paste is digested with 5 ml tert-butyl methyl ether. Approx. 2 ml of the ether phase are taken up with a disposable syringe and forced through a PTFE disposable filter into a GC sample bottle. The sample is then chromatographed. If the conversion is incomplete, stirring must be continued and/or additional iron must be added.

Working up: When 100% conversion is reached, the pigment paste is allowed to cool. 250 to 300 g of the pigment paste are removed from the pot with a ground glass neck for working up. The pigment is washed free from salts and aniline, the residual iron is sieved off and the product is filtered off with suction and dried.

Procedure for experiments 6+7

Reaction container, nominal volume 89 l with:
- infinitely adjustable drive motor,
- 2 stage crossbar stirrer, lower blade set at 30°, conveying upwards,
- steam jacket heating with temperature regulator,
- glass condenser,
- ProMinent metering pump for nitrobenzene,
- ProMinent metering pump for process water Preparation: The reagents required according to the table, aluminum chloride solution, iron, acids and water, are prepared and the pump reservoirs are filled. The cooling water is turned on. The materials described in experiments 1 to 5 are employed as the steel granules and cast iron chips.

The initial mixture is introduced in the sequence shown, at room temperature and while stirring at 175 rpm. The mixture is heated up to the temperature stated in the table.

Progress: When the required temperature is reached, metering is started according to the recipe. For this, the iron is added equally divided into 6 portions, every 10 minutes.

End point: When all the additions have been concluded, the mixture is subsequently stirred for 60 minutes, and complete conversion of the nitrobenzene into aniline is then checked. The washed paste is then worked up as described under experiments 1 to 5.

Procedure for experiments 8 to 10

The experiments are carried out in the manner described previously in the technical equipment described in experiments 7 and 8, employing the amounts stated in the table.

TABLE 2

Substance data for the examples 1–10 and comparison examples A–E

| Sample | L* | a* | b* | C* | S1 Silking Index | Oil abs. value [g] | Bulk dens. [g/ml] | Heat ° C.] Method II*/I | Al cont. | Fe cont. |
|---|---|---|---|---|---|---|---|---|---|---|
| 1 | 58.2 | 12.0 | 49.8 | 50.9 | 2 | 27 | 0.62 | 250 | 1.6% | 59.0% |
| 2 | 58.5 | 11.4 | 49.5 | 50.5 | 1.6 |  | 0.62 | 250 | 1.6% |  |
| 3 | 58.8 | 11.3 | 49.5 | 50.5 | 2.2 |  | 0.64 | 250 | 1.7% |  |
| 4 | 60.1 | 10.6 | 50.7 | 51.5 | 3.3 |  | 0.51 | 250 | 1.2% | 59.4% |

TABLE 2-continued

Substance data for the examples 1–10 and comparison examples A–E

| Sample | L* | a* | b* | C* | S1 Silking Index | Oil abs. value [g] | Bulk dens. [g/ml] | Heat °C.] Method II*/I | Al cont. | Fe cont. |
|---|---|---|---|---|---|---|---|---|---|---|
| 5 | 60.1 | 10.7 | 50.7 | 51.7 | 3.7 | | 0.63 | 250 | 1.2% | |
| 6 | 59.0 | 10.7 | 49.3 | 50.2 | 1.4 | | 0.61 | 250 | 1.6% | |
| 7 | 57.0 | 12.2 | 49.4 | 50.6 | 0.4 | | 0.56 | 250 | 1.0% | 59.7% |
| 8 | 59.3 | 11.1 | 50.0 | 50.9 | 2.4 | | 0.75 | 260 | 1.7% | |
| 9 | 59.2 | 11.9 | 49.2 | 50.1 | 4.1 | | 0.56 | 260/230 | 1.6% | |
| 10 | 59.6 | 10.6 | 49.4 | 50.2 | 2.6 | | 0.60 | 260 | | |
| A | 58.4 | 10.8 | 43.6 | 44.5 | 14.5 | 34 | 0.44 | 220 | 0.2% | |
| B | 51.7 | 9.0 | 35.1 | 36.0 | 4.1 | | 0.53 | 220 | 1.2% | |
| C | 58.8 | 10.8 | 47.6 | 48.5 | 1.9 | | 0.56 | 220/210 | 0.25% | |
| D | 62.0 | 9.6 | 48.5 | 49.2 | 7.7 | | 0.51 | 240 | <0.1% | |
| E | 66.8 | 16.4 | 48.15 | 50.8 | 0.8 | | | | <0.1% | 7.8% |

A = ® Bayferrox 420, iron oxide yellow B = ® Bayferrox 415, iron oxide yellow C = ® Bayferrox 915 Iron oxide yellow (BAYER AG);
D = MAPICO 1000 HRA iron oxide yellow (Columbian Co.)
E = mixture 87.5% ® Lichtgelb 3R iron oxide yellow (Bayer AG)/12.5% ® Bayferrox 420 (Bayer AG)
*Determination of the heat resistance in the thermoplastic ® Vestolen A 6016

What is claimed is:

1. An iron oxide yellow pigment having:
   a) a Fe content of greater than 58 wt %;
   b) a silking index of less than 5;
   c) at a pigment volume concentration of 10% in a test paint, for the Purton of the pigment in the brightness, a L*, of 54–65 CIELAB units, in the saturation C* of 38–65 CIELAB units, a red content a* of 8–15 CIELAB units, and a yellow content of 37–55 CIELAB units; and
   d) a heat resistance of greater than 230° C. in polyethylene for at least 5 minutes.

2. The iron oxide yellow pigment according to claim 1, wherein the yellow content b* is 37–53 CIELAB units and the red content a* is 8–14 CIELAB units.

3. The iron oxide yellow pigment according to claim 1, wherein the heat resistance is greater than 260° C.

4. The iron oxide yellow pigment according to claim 1, wherein the silking index is less than 3.

5. The iron oxide yellow pigment according to claim 1, wherein the bulk density is above 0.5 g/ml.

6. A coloured thermoplastic material comprising the iron oxide yellow pigment according to claim 1.

7. A method of colouring thermoplastic material comprising adding the iron oxide yellow pigment according to claim 1 to thermoplastic material.

8. A coloured laminating paper comprising the iron oxide yellow pigment according to claim 1.

9. A method of colouring laminating paper comprising adding the iron oxide yellow pigment according to claim 1 to laminating paper.

10. A coloured building material comprising the iron oxide yellow pigment according to claim 1.

11. A method of colouring building material comprising adding the iron oxide yellow pigment according to claim 1 to building material.

12. A colored paint comprising the iron oxide yellow pigment according to claim 1.

13. A method of colouring paint comprising adding the iron oxide yellow pigment according to claim 1 to paint.

14. A coloured powder coating composition comprising the iron oxide yellow pigment according to claim 1.

15. A method of colouring powder coating composition comprising adding the iron oxide yellow pigment according to claim 1 to powder coating composition.

16. A coloured enamel comprising the iron oxide yellow pigment according to claim 1.

17. A method of colouring enamel comprising adding the iron oxide yellow pigment according to claim 1 to enamel.

18. A process for making the iron oxide yellow pigment according to claim 1 in an iron-dissolving process comprising:
   a) oxidizing metallic iron with nitrobenzene in an acid medium; and
   b) carrying out the oxidation in the presence of elements chosen from main groups 3 and 4 of the periodic table.

* * * * *